ARNE APPEL INVENTOR.
BY
Frank R Jifari
AGENT

Dec. 3, 1968 A. APPEL 3,414,269

RECORDING AND/OR PLAYBACK APPARATUS

Filed March 7, 1966 3 Sheets-Sheet 2

INVENTOR.

ARNE APPEL

BY

Frank R. Jufani

AGENT

INVENTOR.
ARNE APPEL
BY
Frank R. Trifari
AGENT

1

3,414,269

RECORDING AND/OR PLAYBACK APPARATUS

Arne Appel, St. Michael im Lungau, Austria, assignor to North American Philips Company, Inc., New York, N.Y., a corporation of Delaware Filed Mar. 7, 1966, Ser. No. 532,181
Claims priority, application Austria, Mar. 12, 1965, A 2,242/65
7 Claims. (Cl. 274—4)

ABSTRACT OF THE DISCLOSURE

Apparatus incorporating an indicator, indicating the length of tape taken from a supply magazine and of which a pointer is automatically reset to zero by means of a tape threading slide for transporting a tag at the leading end of the tape from the supply magazine to a take-up reel. The pointer is reset to zero when the tag arrives at the take-up reel.

The invention relates to a recorder/reproducer apparatus, in particular a dictating machine, comprising a threading device for taking an elongated thin flexible record carrier in the form of a tape or wire from a supply magazine and transporting the record carrier towards a take-up device. The threading device is movable between two extreme positions between the supply magazine and the take-up device and is provided with a catch for engaging the record carrier. The apparatus further includes an indicator for indicating the quantity of record carrier removed from the supply magazine.

In recording and/or play-back apparatus employing such a threading mechanism for the record carrier the indicator is reset to zero in a particularly simple manner in that, according to the invention, decoupling members are provided between the threading device and the movable part of the coupling, said members releasing the coupling as soon as the threading device is moved from its extreme position adjacent the supply space in the direction of the winding device.

The provision of the decoupling members according to the invention ensures in a particularly simple manner an automatic resetting to zero, which is safeguarded against mis-operation, of the indicator during the threading of the record carrier.

Figure 1:
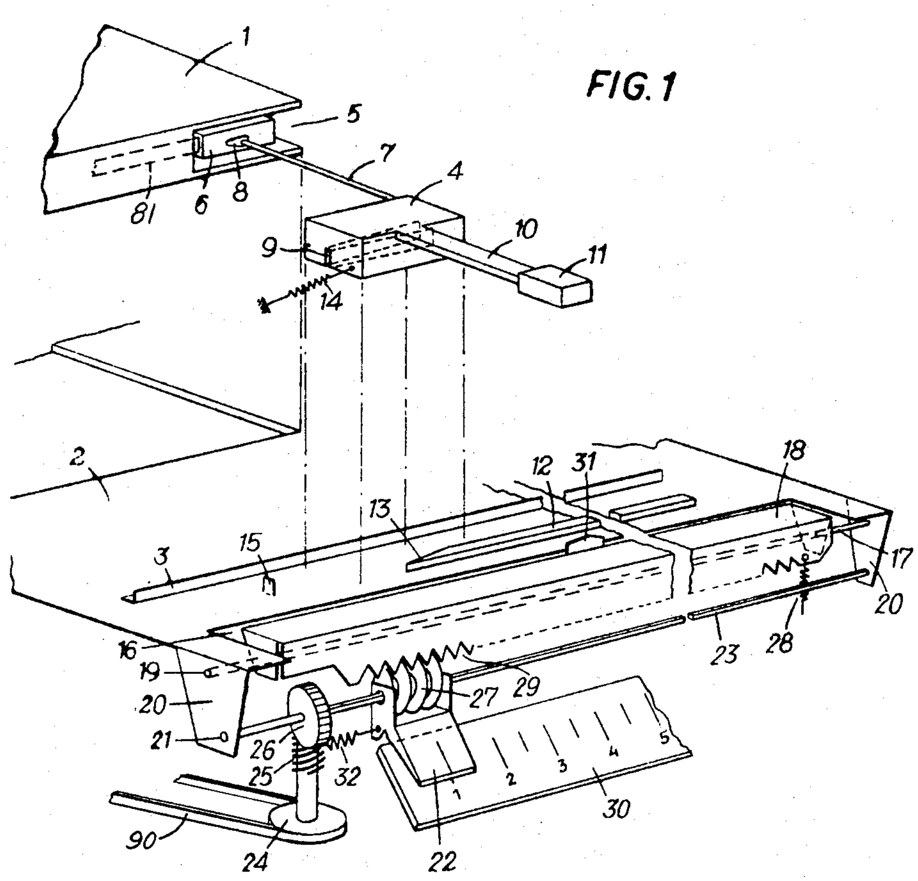

In order that the invention may readily be carried into effect a few examples thereof will now be described in greater detail, by way of example, with reference to the accompanying drawings, in which:

FIG. 1 of the drawing shows part of a recorder/reproducer incorporating an indicator comprising a straight scale and indicating the length of tape taken from a tape magazine, in which the pointer is reset to zero by means of a threading device constructed in the form a slide.

Figure 2A:
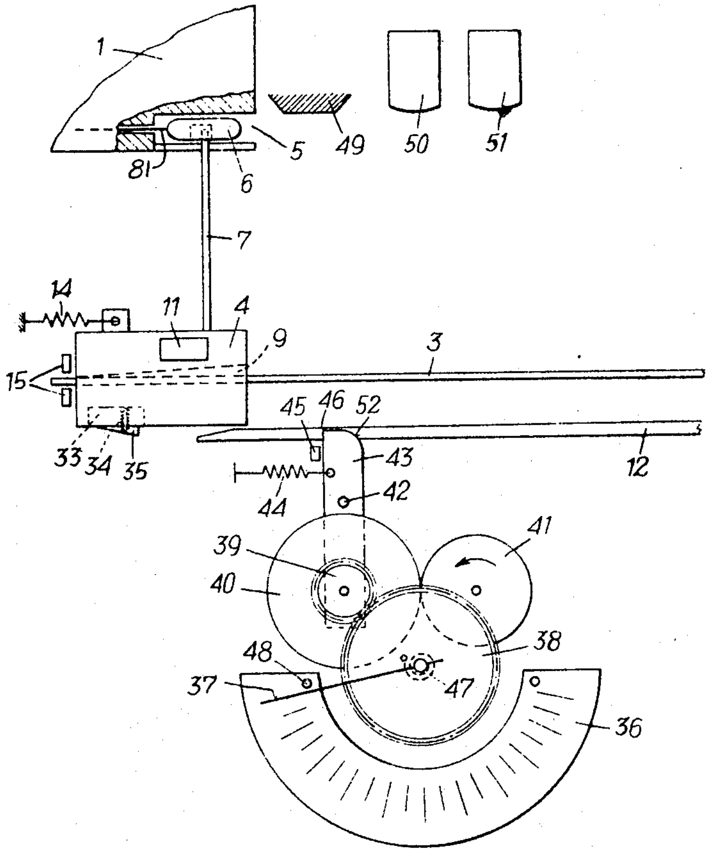

FIG. 2*a* is a plan view of an embodiment in which the scale of the indicator is an arc of a circle, the threading mechanism again being in the form of a slide.

Figure 2B:
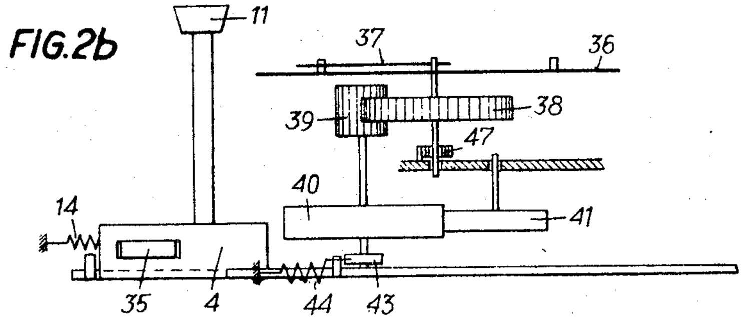

FIG. 2*b* partly diagrammatically shows a front elevation of the device shown in FIG. 2*a*.

Figures 3A, 3B:
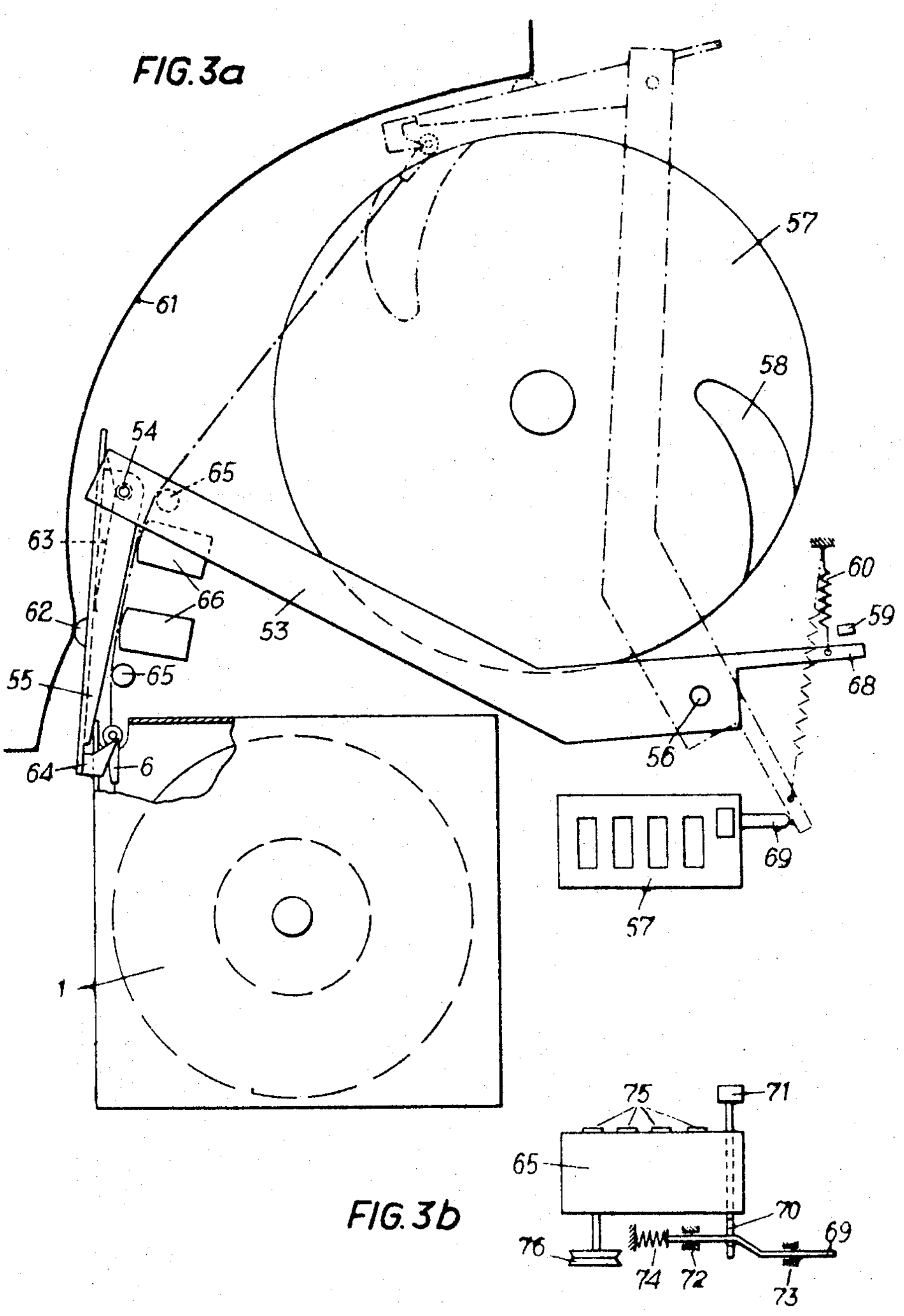

FIG. 3*a* shows two operating conditions of a lever-like threading mechanism which, when actuated, resets to zero a roller counting mechanism.

FIG. 3*b* is a side elevation of part of the device shown in FIG. 3*a*.

Referring now to FIG. 1, a record carrier storage element is constituted by a magazine of which only part is shown. This magazine lies on the apparatus and is held in position on the supporting plate 2 and is held there by stop members (not shown). A threading device for transporting the record carrier 81 to the winding device and constituted by a threading slide 4 which, in operation,

2 slides along a guide rail 3 are shown remote from the supporting plate 2 for reasons of clarity.

The tape 81 shown is fully wound in the supply magazine 1. An aperture 5 at one corner of the magazine houses the tag 6 attached to the beginning of the tape 81. The catch 7 in the slide 4 engages the tag 6 by intermeshing with the recess 8 therein in a manner to be described hereinafter.

In the surface of the threading slide 4 sliding on the supporting plate 2 a groove 9 is provided for overriding the guide beams. The groove is wedge-shaped with the wide portion opening in the direction of transport of the tape 81. When the slide 4 is moved to the right along the guide beam 3 in response to movement of the element 11 and the slide arm 10, the slide 4 strikes the bevelled edge 13 on a second guide rail 12 and is rotated counterclockwise with respect to the first guide rail 3. The slight rotation permits the catch 7 to engage in the recess 8 of the tag 6. The guide rail 12 further serves to guide the slide 4 as it is moved laterally across the support plate 2. When the slide 4 is moved to the right, the catch 7 transports the tag 6 to a take-up reel (not shown). The return spring 14 resets the slide after the threading operation. The abutment member 15 determines the initial condition of the slide adjacent the side of the tape supply magazine.

In front of the guide rails 3 and 12 the support plate 2 has a recess 16 for receiving the indicator apparatus 18–30 which indicates how much tape has been taken out of the supply space. This indicator apparatus 18–30 includes a releasable coupling assembly 18, 22, 27–29, and 31–32 and is automatically reset to zero if said coupling is released. For this purpose the releasable coupling assembly is provided with a beam 18 rotatable about a shaft 17 which serves as the movable part of the coupling. The bearings for the shaft 17 are constituted by apertures 19 in two projections 20 which are bent at right angles with respect to the supporting plate. Two apertures 21 in the projections 20 serve as bearings for a pointer shaft 23 of the indicator carrying the pointer 22. The drive for moving the pointer 22 is effected, for example, through a belt 90 coupled to the shaft of a supply reel (not shown) and the wheel 24. A worm 25 is attached to the shaft of the wheel 24 and intermeshes with a gear 26 which is rigidly secured to the pointer shaft 23. A worm 27 which meshes with the teeth 29 on the beam 18 drives the pointer 22 axially along the prismatic pointer shaft 23. The worm 27 cannot rotate relative to the shaft 23. A spring 28 is secured to the beam 18 and maintains the worm 27 in engagement with the toothed edge 29 of said rotatably mounted beam 18. The worm 27 and the pointer 22 coupled thereto move in either axial direction along the pointer shaft 23 dependent on the direction of rotation of the wheel 24. A scale 30 extends parallel to the pointer shaft 23 and indicates the amount of tape remaining on the supply magazine.

On the portion of the rotatable beam 18 parallel to the supporting plate 2 a nose 31 is provided which projects at right angles with respect to the support plate 2. When the slide 4 moves from the left to the right the arm 10 of the threading slide 4 strikes and depresses the nose 31 thus pivoting the beam 18 about the shaft 17. As a result, the teeth 29 on the beam 18 are pivoted upwards thus releasing the worm 27 which releases the pointer 22. As soon as the teeth 29 disengages the worm 27, the pointer 22 is moved to the left by the return spring 32 and is reset in the rest condition. This disengagement substantially coincides with the engagement of the tape tag 6 with the take-up reel (not shown).

So when a record carrier is transported from the supply magazine 1 to the take-up magazine by the winding device, the indicator which records the quantity of record carrier removed from the supply magazine is automatically set to zero. As a result of this automatic setting an accurate representation of the amount of tape on which data can be recorded is insured.

FIGS. 2*a* and 2*b* show a corresponding tape threading device, likewise in the form of a slide as shown in FIG. 1, of a recording reproducing apparatus which, when the tape is threaded in the winding device, resets to zero an indicator which indicates the length of tape supplied from the supply magazine and comprises a scale in the form of an arc of a circle.

The figures again show the supply magazine 1 for the tape 81, the tag 6 of the tape in the space 5, the threading slide 4 with the wedge-shaped groove 9 and the catch 7, as well as the guide rails 3 and 12. The return spring 14 and the abutment members 15 determine the initial position of the slide on the side of the supply magazine. On the side of the threading slide 4 facing the indicator a projection 35 which is forced outwards by a spring 34 is located in a recess 33.

The indicator 36–46 is provided with a scale 36 in the form of an arc of a circle and indicates the quantity of tape taken out of the supply magazine. The indicator consists of the toothed wheel 38 coupled to the pointer 37 which wheel constitutes the non-operable member of the coupling 38, 39, 40 of the indicator and is driven by the friction wheel 41 through idlers 39 and 40. The idlers 39 and 40 are journalled on a lever 43 rotatable about the shaft 42 and constitute the operable member of the coupling of the indicator. The spring 44 and the abutment member 45 determine the operative condition of the coupling. The friction wheel 41 is driven, for example, through a belt from the shaft of the tape.

If now the threading slide 4 is moved by the member 11 to the right as viewed in FIG. 2*a* to transport the tape towards the take-up reel, the projection 35 engages the side 46 of the lever 43 and causes the lever 43 to rotate about the shaft 42. As a result of this the engagement of the toothed wheels 38 and 39 is interrupted and the pointer 37 is reset in the rest position, which is determined by the abutment member 48 on the scale 36, by the force of the return spring 47. So in this embodiment the lever 43 and the projection 35 act as decoupling members. Thus, whenever the tape is transported towards the take-up reel, the indicator which indicates the quantity of tape taken from the supply magazine is automatically reset to zero.

During the further threading operation the tag 6 is transported by the catch 7 along a guide 49 (not shown in detail) and the magnetic heads 50 and 51 towards the take-up reel (not shown). The threading slide 4 can return to the rest position thereby passing the lever 46. Although this lever 46 is blocked in this direction of movement of the slide 4 by the abutment 45, the slide 4 can still pass the lever 46 because the projection 35 is forced into the recess 33 against the action of the spring 34 by the round edge 52 of the extension of the lever 43.

FIG. 3*a* shows two operating conditions of a tape threading device in the form of a lever 53 which is shown in broken lines in the extreme position adjacent a take-up reel 57 and resets to zero an indicator 67 in the form of a counter with counter rollers.

The supply magazine which determines one extreme position of the tag 6 is again denoted by 1. This embodiment comprises a rotatable lever 53 which, together with a catch 55 which is pivotally secured to a lever 53 by means of the pivot 54, transports the tag 6 from the tape supply magazine 1 to the take-up reel 57 when it rotates clockwise as viewed in FIG. 3*a* about a shaft 56. The take-up reel 57 in this embodiment consists of a reel with a grablike recess 58 which catches the tag 6 when the reel rotates and transports it to the core of the reel.

The rotary movement of the lever 53 about the shaft 56 may be effected in various manners not shown, for example, manually or by means of the take-up reel 57 which, through a transmission gear comes into engagement with the lever 53 for a short time after operating a switch-on button. A return spring 60 resets the lever 53 in its rest position not shown determined by a stop member 59.

The control of the movement of the catch 55 for catching the tag 6 is effected by means of a guide path 61 along which the catch slides with a nose 62 under the influence of a sear spring 63. When the lever 53 is rotated out of its rest position the tip 64 of the catch 55 slides into the apertures of the supply magazine, catches the tag 6 and thereby transports the tape along the guide pins 65 and the magnetic heads 6 to the final position shown in dotted lines. As already stated, the extension is caught in this position by the take-up reel 57.

In the final position of the lever 53 shown in broken lines the counter 67 for indicating the quantity of tape taken from the supply magazine is reset by the projection 68 of the lever 53 by means of a driving rod 69. As shown in greater detail in FIG. 3*b* the counter can be reset to zero because the driving rod 69 consists of two parallel parts interconnected by a third part and is capable of sliding into a recess 70 of the button 71 which is provided for the manual resetting to zero of the counter. If the driving rod 69 is moved longitudinally the button 71 is moved transversely to this longitudinal movement in a constrained manner, so that the counter is reset to zero in a manner known per se. In this arrangement the decoupling members are arranged in the counter and comprises, for example, as is normal in such counters, of a rotatable brace which carries the forward switching toothed wheel of the counter rollers and, for example, of a cardioid resetting device for resetting the counter rollers to zero. Bearings 72 and 73 ensure a guiding of the driving rod 69 and a pressure spring 74 determine the rest condition thereof. The counter rollers for indicating the quantity of record carrier taken out of the supply space are denoted by 75. The drive of the counting mechanism is effected through the wheel 76.

Thus in this embodiment the indicator is reset to zero, that is to say decoupled by the threading device, after the latter has reached its final position adjacent the take-up reel.

As will be clear from the above the measures according to the invention may be applied to several kinds of mechanisms and to several types of devices for transporting a tag provided at the beginning of a tape from a supply space to a take-up reel. Thus numerous variations are possible for those skilled in the art without leaving the scope of this invention.

What is claimed is:

1. An indicator reset apparatus for a recorder/reproducer having a supply magazine including an elongated thin flexible record carrier therein, a take-up magazine for receiving said record carrier from said supply magazine, and means for driving said record carrier comprising: a threading device for transporting one end of said record carrier from said supply magazine to said take-up magazine, said threading device comprising catch means for engaging said one end of said record carrier located in said supply magazine; indicator means coupled to said recorder/reproducer for indicating the length of record carrier removed from said supply magazine; means for driving said indicator, said indicator drive means being coupled to the drive of said record carrier on said recorder/reproducer whereby said indicator indicates the amount of said record carrier removed from said supply magazine; and means for returning said indicator to a zero setting in response to transporting said one end of said record carrier from said supply magazine to said take-up magazine by said threading device.

2. An indicator reset apparatus according to claim 1 wherein said indicator means comprises a movable pointer means mounted on said recorder/reproducer, a scale adjacent said movable indicator for registering with the pointer the length of said record carrier removed from the supply magazine; and said indicator drive means moves said pointer means along said scale in response to varying the amount of said record carrier in said supply magazine.

3. An indicator reset apparatus according to claim 2 further comprises a releasable interconnecting means coupling said indicator means and said indicator drive means, and means for actuating said releasable interconnecting means in response to transport of said one end of said record carrier from said supply magazine to said take-up magazine by said threading device.

4. An indicator reset apparatus according to claim 3, wherein said indicator means further comprises a rotatable shaft mounted on said recorder/reproducer; said movable pointer means comprises a gear attached to said rotatable shaft and a pointer coupled to said gear; said means to drive said indicator comprises means to rotate said shaft attached to said record carrier drive; said releasable interconnecting means comprises a beam paralleling said shaft and pivoting around the longitudinal axis thereof, said beam having a plurality of teeth extending longitudinally thereof normally intermeshed with the teeth on said gear, whereby rotation of said shaft moves said gear and pointer axially along said rotatable shaft, and a spring normally holding said toothed means of said beam in said intermeshed engagement with said gear teeth; and said means for returning said indicator to a zero setting comprises a return spring attached to said indicator means and said recorder/reproducer normally positioning said pointer at said zero setting.

5. An indicator reset apparatus according to claim 4, wherein said means for actuating said releasable interconnecting means comprises first abutment means on said threading device and second abutment means on said pivotal beam wherein said toothed means on said pivotal beam are disengaged from said gear in response to interengagement of said first and second abutment means.

6. An indicator reset apparatus according to claim 3 wherein said movable pointer means further comprises a pointer and a first drive wheel mounted on a common shaft; said indicator drive means comprises a plurality of drive wheels interconnecting said first drive wheel and said drive of said record carrier for moving said pointer along said scale in response to varying the amount of said record carrier in said supply magazine; said releasable interconnecting means comprises a pivotal lever coupled to one drive wheel of said plurality of drive wheels for moving said one drive wheel of said plurality of drive wheels out of operative engagement with the remainder of said plurality of drive wheels in response to movement of said record carrier from said supply magazine to said take-up magazine by said threading device.

7. An indicator reset apparatus according to claim 1 wherein said indicator means comprises a counter designating the length of record carrier removed from said supply magazine, and said means for returning said indicator to a zero setting comprises a reset means attached to said counter.

References Cited

UNITED STATES PATENTS

| | | | |
|---|---|---|---|
| 2,994,746 | 8/1961 | Collier et al. | 179—100.2 |
| 2,964,593 | 12/1960 | Kleve | 179—100.2 |

LEONARD FORMAN, *Primary Examiner.*

ROGER A. FIELDS, *Assistant Examiner.*